(12) United States Patent
Li

(10) Patent No.: US 7,962,808 B2
(45) Date of Patent: Jun. 14, 2011

(54) METHOD AND SYSTEM FOR TESTING THE COMPLIANCE OF PCIE EXPANSION SYSTEMS

(75) Inventor: Yuan Li, Shenzhen (CN)

(73) Assignee: NVIDIA Corporation, Santa Clara, CA (US)

( * ) Notice: Subject to any disclaimer, the term of this patent is extended or adjusted under 35 U.S.C. 154(b) by 275 days.

(21) Appl. No.: 12/132,587

(22) Filed: Jun. 3, 2008

(65) Prior Publication Data

US 2009/0265590 A1 Oct. 22, 2009

(30) Foreign Application Priority Data

Apr. 22, 2008 (CN) .......................... 2008 1 0092323

(51) Int. Cl.
  *G01R 31/28* (2006.01)
  *G01R 31/08* (2006.01)
  *G06F 13/42* (2006.01)
  *G06F 13/20* (2006.01)
  *H04L 5/16* (2006.01)
(52) U.S. Cl. ........ 714/716; 714/712; 710/106; 710/313; 370/224; 370/249; 375/221
(58) Field of Classification Search .................. 741/716, 741/712; 710/106, 313; 370/224, 249; 375/221
See application file for complete search history.

(56) References Cited

U.S. PATENT DOCUMENTS

| 7,132,823 | B2 * | 11/2006 | Ng et al. .................... 324/158.1 |
| 7,231,560 | B2 * | 6/2007 | Lai et al. ....................... 714/712 |
| 7,434,118 | B2 * | 10/2008 | Moessinger et al. .......... 714/715 |
| 7,437,643 | B2 * | 10/2008 | Khanna et al. ................ 714/733 |
| 7,447,953 | B2 * | 11/2008 | Vogt .............................. 714/716 |
| 7,464,307 | B2 * | 12/2008 | Nejedlo et al. ................ 714/712 |

OTHER PUBLICATIONS

Keezer et al., Source-Synchronous Testing of Multilane PCI Express and HyperTransport Buses, Jan.-Feb. 2006, IEEE, pp. 46-57.*

* cited by examiner

*Primary Examiner* — John J Tabone, Jr.
(74) *Attorney, Agent, or Firm* — Patterson & Sheridan, LLP

(57) ABSTRACT

The present application describes a method and system for testing the compliance of a PCIE expansion system to verify that data signals transmitted through multiple data lanes in the expansion system comply with the PCIE requirements. The method for testing a PCIE expansion system comprises delivering the data signals from the data lanes to a compliance board that is configured to loop back at least a first portion of the data signals and transmit a complementary second portion of the data signals to a testing device, and testing a compliance of the second portion of the data signals with the PCIE requirements. The first portion of the data signals is then tested through a second compliance board that is configured to loop back the second portion of the data signals and transmit the first portion of the data signals to the testing device.

20 Claims, 7 Drawing Sheets

US 7,962,808 B2

METHOD AND SYSTEM FOR TESTING THE COMPLIANCE OF PCIE EXPANSION SYSTEMS

CROSS-REFERENCE TO RELATED APPLICATIONS

This application claims the benefit of People's Republic of China Application No. 200810092323.2, filed on Apr. 22, 2008.

BACKGROUND OF THE INVENTION

1. Field of the Invention

The present invention relates to methods and systems for testing the compliance of PCIE expansion systems.

2. Description of the Related Art

Unless otherwise indicated herein, the approaches described in this section are not prior art to the claims in this application and are not admitted to be prior art by inclusion in this section.

Nowadays, the Peripheral Component Interconnect Express ("PCIE") standard has replaced the Accelerated Graphics Port ("AGP") standard as the most common interface for graphics cards on computer systems. Unlike the previous generation of interface standards, the PCIE interface uses a plurality of point-to-point full duplex serial links, also called lanes, which allow bidirectional communication at high bandwidth data transfer. Having superior capabilities, the PCIE interface can thus be advantageously used in current computer systems for coupling a central processing unit ("CPU") to multiple processing units, such as graphics processing units ("GPUs"), thereby allowing increased performance of the computer systems.

In practical implementations, a PCIE expansion system is usually coupled between a motherboard of the computer system and the multiple PCIE slots to which external devices can be coupled. During operation, data signals are transmitted through data lanes on the PCIE expansion system to be exchanged between the CPU and the external devices. However, to ensure that the PCIE expansion system operates properly, compliance tests are needed to verify that signals transmitted through the PCIE expansion system comply with the PCIE requirements. Unfortunately, current testing methods fail to provide suitable solutions to test the numerous data signals that are exchanged through the PCIE expansion system.

What is needed in the art is thus a method and system for testing the compliance of PCIE expansion systems in a cost-effective manner to verify that data signals transmitted through multiple data lanes in the expansion system comply with the PCIE requirements.

SUMMARY OF THE INVENTION

The present application describes a method and system for testing the compliance of a PCIE expansion system to verify that data signals transmitted through multiple data lanes in the expansion system comply with the PCIE requirements. Specifically, in one embodiment, the method for testing a PCIE expansion system comprises delivering the data signals from the data lanes to a compliance board that is configured to loop back at least a first portion of the data signals and transmit a complementary second portion of the data signals to a testing device, and testing a compliance of the second portion of the data signals with the PCIE requirements.

In another embodiment, a system for testing a PCIE expansion system is disclosed. The system comprises at least a first compliance board and a second compliance board configured to test different data lane signals of the PCIE expansion system, wherein the first compliance circuit board comprises a plurality of first circuit traces configured to loop back at least a first portion of the data signals, and a plurality of second circuit traces configured to transmit a complementary second portion of the data signals to a plurality of first connectors for testing, and the second compliance board comprises a plurality of third circuit traces configured to loop back the second portion of the data signals, and a plurality of fourth circuit traces configured to transmit the first portion of the data signals to a plurality of second connectors for testing.

Because the data signals of the PCIE expansion system are grouped into smaller sets of data lane signals for separate testing, the design of each compliance board can be simplified and its surface area reduced as less data signals are transmitted through the compliance board for testing.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present application describes a system and method for testing the compliance of a PCIE expansion system. In one embodiment, the expansion system includes two bridge chips that are coupled to each other via a PCIE cable. To test the compliance of the PCIE expansion system, each bridge chip is coupled to a compliance board configured to transmit selected data signals to a testing unit.

Figure 1:
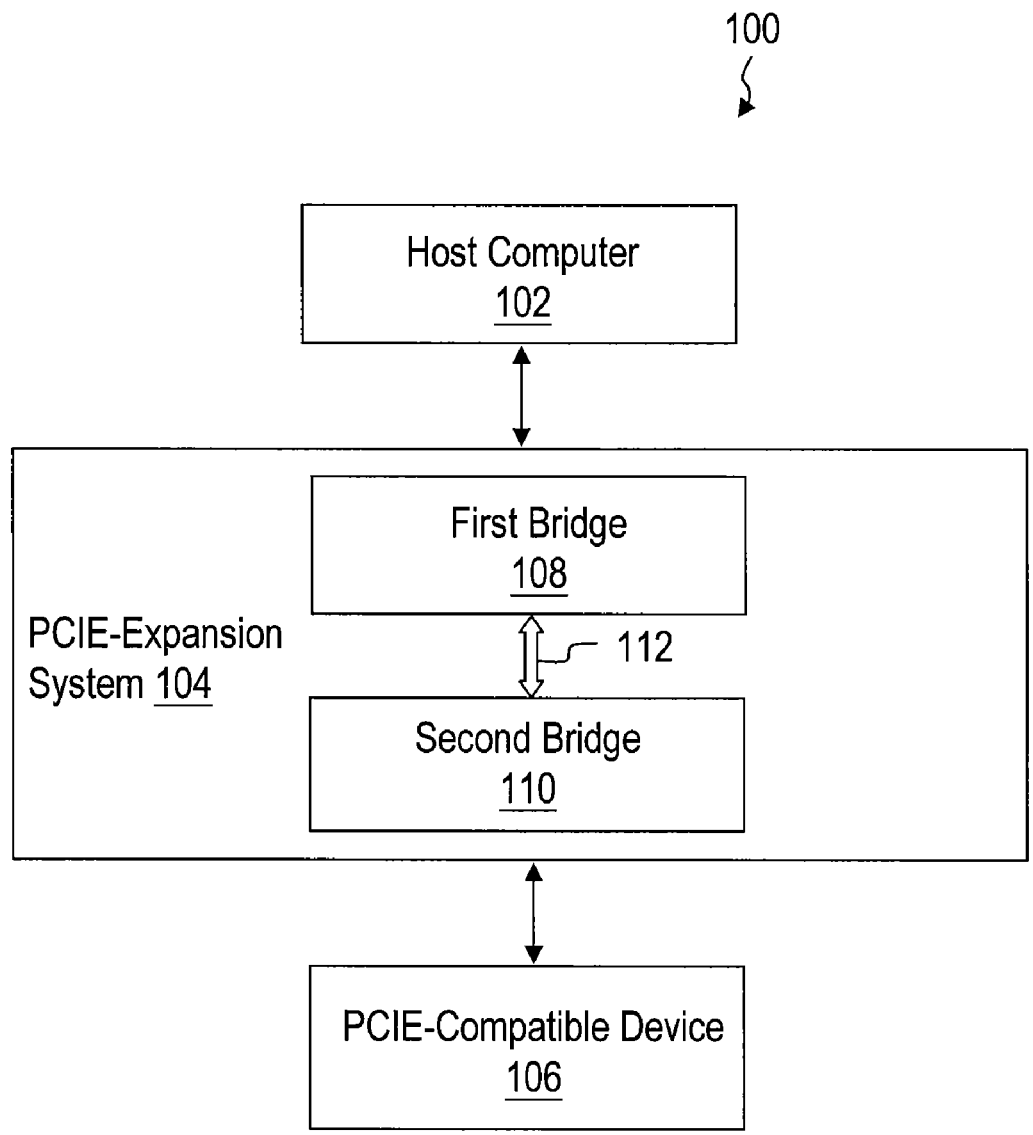
FIG. 1 is a simplified block diagram showing a computer system including a PCIE expansion system.

FIG. 1 is a simplified block diagram showing a computer system 100 including a PCIE expansion system 104. The computer system 100 includes a host computer 102 and one or more PCIE-compatible device 106 coupled to the host computer 102 through the PCIE expansion system 104. Examples of the PCIE-compatible device 106 may include, without limitation, one or more graphics cards. The expansion system 104 includes a first bridge chip 108 and a second bridge chip 110. The first bridge chip 108 connects to the host computer 102 through a PCIE link. The second bridge chip 110 may include multiple PCIE slots (not shown) thereon for connecting the PCIE-compatible device 106. Electric signals are transmitted between the first bridge chip 108 and the second bridge chip 110 via a PCIE cable 112. These signals may comprise, without limitation, synchronization signals, data signals, and the like. The second bridge chip 110 is configured to transfer these signals to the PCIE slot where the PCIE-compatible device 106 is coupled. In other words, one PCIE slot on the host computer 102 can correspond to one or more PCIE slots provided on the second bridge chip 110. To ensure that the PCIE expansion system 104 operates correctly, a compliance test of the PCIE expansion system 104 requires verifying that the data signals that are transmitted between the first bridge chip 108 and the second bridge chip 110 comply with the requirements of the PCIE interface format.

Figure 2A:
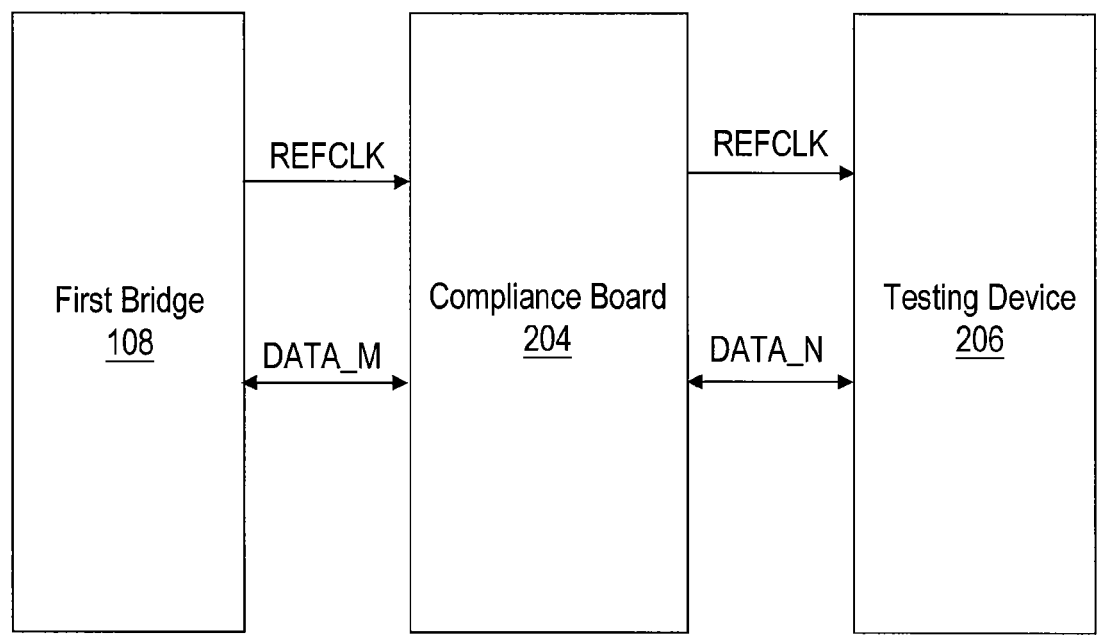
FIG. 2A is a simplified block diagram showing the connection of a first bridge chip of a PCIE expansion system for the compliance testing, according to one embodiment of the present invention.

FIG. 2A is a simplified block diagram showing the connection of the first bridge chip 108 of the PCIE expansion system 104 for the compliance testing, according to one embodiment of the present invention. The first bridge chip 108 under testing is coupled to a compliance board 204 through which selected electric signals are transmitted to a testing device 206 for undergoing testing. A host computer (not shown) may also be coupled upstream the first bridge chip 108 during testing. Electric signal connections between the first bridge chip 108 and the compliance board 204 comprise, without limitation, synchronization signals REFCLK and a first number of data signals DATA_M. Electric signal connections between the compliance board 204 and the testing device 206 comprise the synchronization signals REFCLK and a second number of data signals DATA_N, wherein the second number of data signal DATA_N is less than the first number of data signals DATA_M. In other words, the compliance board 204 is configured to transmit only a portion of the data signals DATA_M available at the output of the first bridge chip 108 to the testing device 206 for undergoing testing, and loop back an untested portion of the data signals DATA_M to the first bridge chip 108. In this manner, the surface area and circuit layout complexity of the compliance board 204 can be reduced.

Figure 2B:
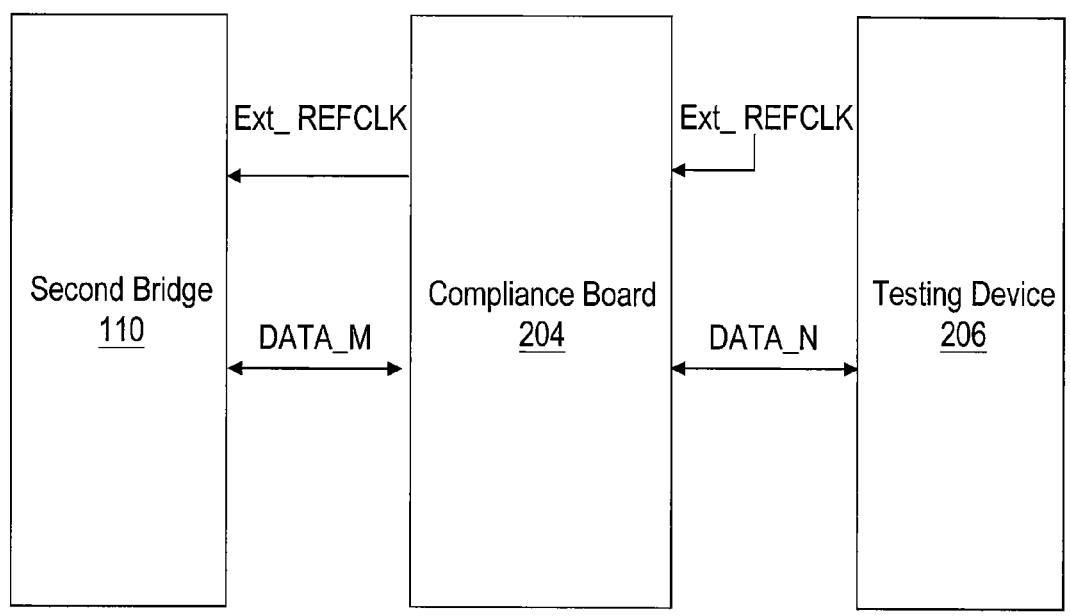
FIG. 2B is a simplified block diagram showing the connection of a second bridge chip of a PCIE expansion system for the compliance testing, according to one embodiment of the present invention.

FIG. 2B is a simplified block diagram showing the connection of the second bridge chip 110 of the PCIE expansion system 104 for the compliance testing, according to one embodiment of the present invention. In the same manner, the second bridge chip 110 is coupled to the compliance board 204 through which selected electric signals are transmitted to the testing device 206 for undergoing testing. However, the supply of external synchronization signals Ext_REFCLK may be required to simulate an operation state in which the second bridge chip 110 receives synchronization signals.

Figure 3A:
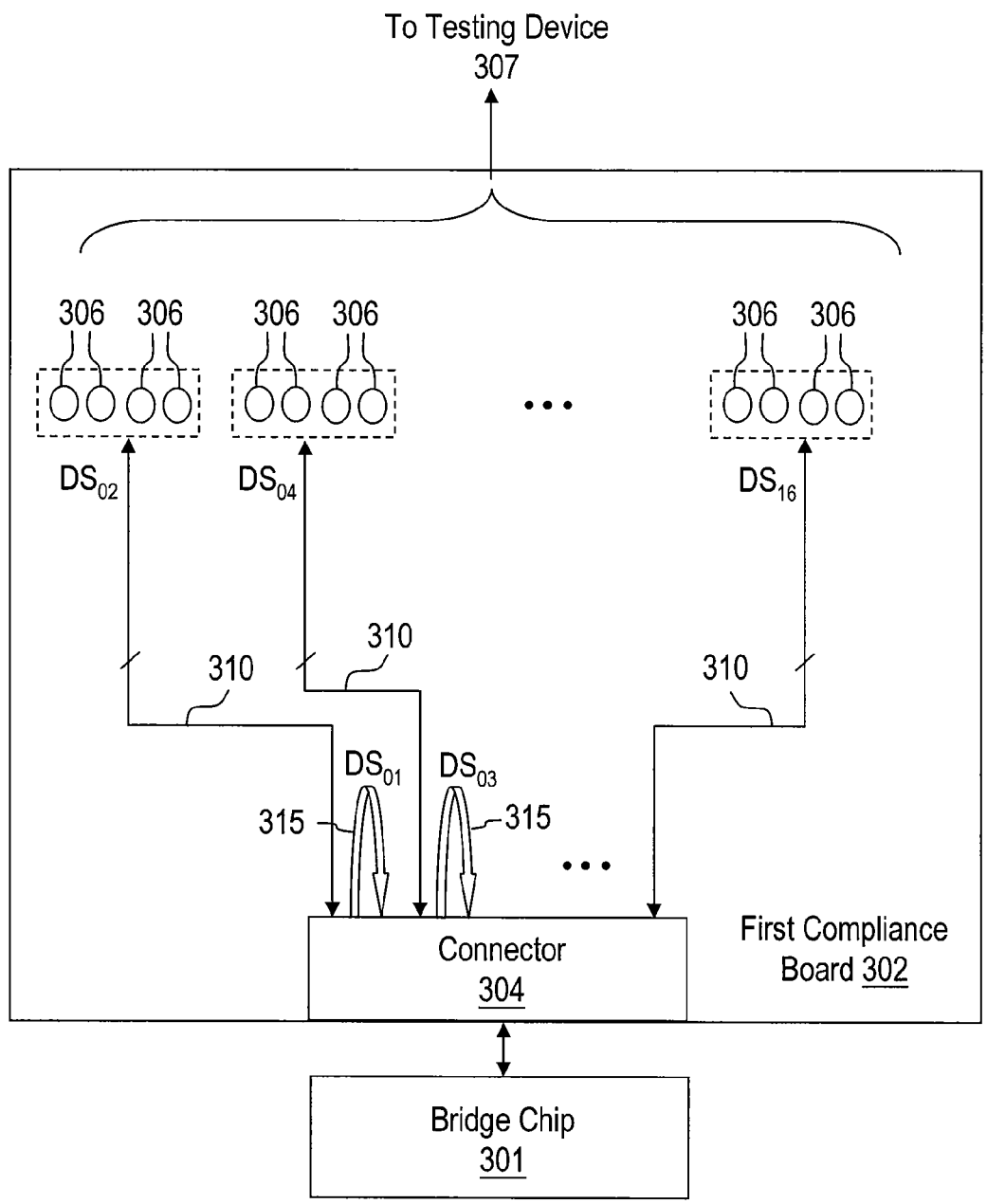
FIG. 3A is a schematic diagram of a first compliance board configured to transmit selected data signals carried on even data lanes for compliance testing, according to one embodiment of the present invention.

FIG. 3A is a schematic diagram of a first compliance board 302 configured to transmit selected data signals carried on even data lanes for compliance testing, according to one embodiment of the present invention. The first compliance board 302 comprises a connector 304 for coupling with a bridge chip 301 under testing, which may be either the first bridge chip 108 or second bridge chip 110 of FIG. 1. In addition, the first compliance board 302 comprises a plurality of Subminiature Version A ("SMA") connectors 306 for coupling with a testing device 307, first circuit traces 310 for transmitting tested data signals between the connector 304 and the SMA connectors 306, and second circuit traces 315 for returning untested data signals back to the bridge chip 301. In one embodiment, suppose the bridge chip 301 includes sixteen data lanes for transmitting and receiving PCIE-format data signals, the connector 304 may be a Very High Density Cable Interconnect ("VHDCI") connector, such as the PCIE 16x iPass™ connector provided by the company MOLEX. The sixteen data lanes may be divided into eight even-numbered data lanes carrying even data lane signals $DS_{02}, DS_{04}, \ldots DS_{16}$, and eight odd-numbered data lanes carrying odd data lane signals $DS_{01}, DS_{03}, \ldots DS_{15}$. In this case, selected signals transmitted through the first circuit traces 310 comprise the even data lane signals $DS_{02}, DS_{04}, \ldots DS_{16}$, and untested data signals looped back through the second circuit traces 315 comprise odd data lane signals $DS_{01}, DS_{03}, \ldots DS_{15}$.

Figure 3B:
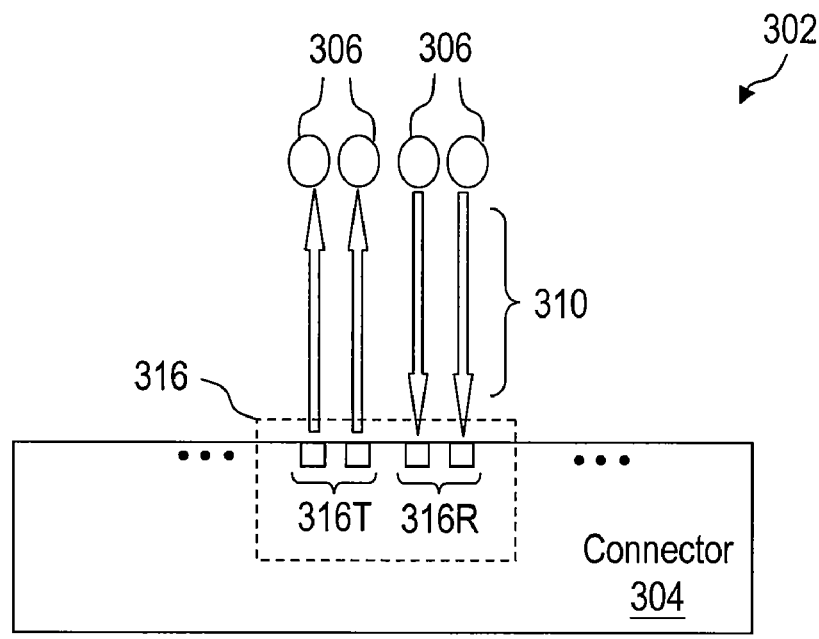
FIG. 3B is a schematic diagram illustrating how tested data signals are transmitted between one even data lane and two pairs of corresponding SMA connectors on the first compliance board of FIG. 3A, according to one embodiment of the present invention.

FIG. 3B is a schematic diagram further illustrating how tested data signals are transmitted between one even data lane 316 and two pairs of corresponding SMA connectors 306 on the first compliance board 302, according to one embodiment of the present invention. Each even data lane 316 comprises two low voltage differential signaling ("LVDS") pairs, i.e. one receiver pair 316R and one transmitter pair 316T. The first circuit traces 310 are configured to transmit data signals between each of the receiver pair 316R and transmitter pair 316T and a respective pair of SMA connectors 306. Each even data lane signal can thereby be supplied via one SMA connector 306 to the testing device 307 for undergoing testing.

Figure 3C:
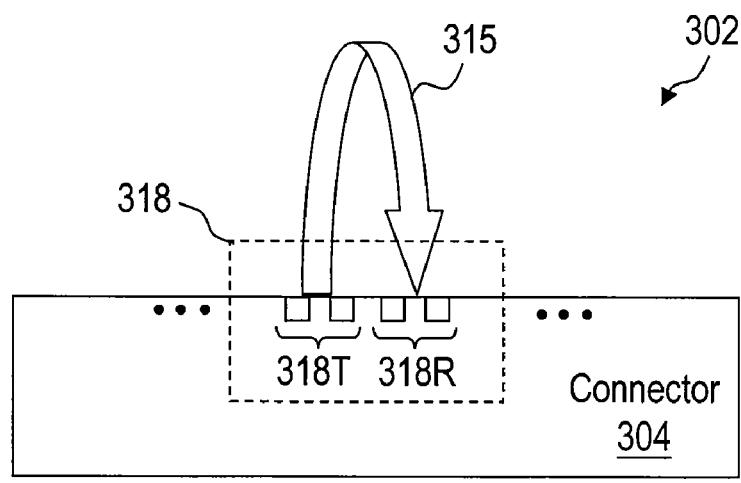
FIG. 3C is a schematic diagram illustrating how untested data signals from one odd data lane are looped back on the first compliance board of FIG. 3A, according to one embodiment of the present invention.

FIG. 3C is a schematic diagram illustrating how untested data signals from one odd data lane 318 are looped back on the first compliance board 302, according to one embodiment of the present invention. Like even data lanes 316, each odd data lane 318 comprises two LVDS pairs, i.e. one receiver pair 318R and one transmitter pair 318T. The second circuit traces 315 are configured to connect the transmitter pair 318T to the receiver pair 318R of each odd data lane 318. Untested odd data lane signals are thereby looped back, and are not transmitted to the testing device 307.

Because the first compliance board 302 is configured to selectively test even lane data signals, a smaller number of SMA connectors 306 are required on the first compliance board 302. As a result, the surface area and circuit layout complexity of the first compliance board 302 are advantageously reduced. After the data signals from even data lanes have been tested, the data signals from odd data lanes may then be tested through a second compliance board configured according to a similar design approach.

Figure 4:
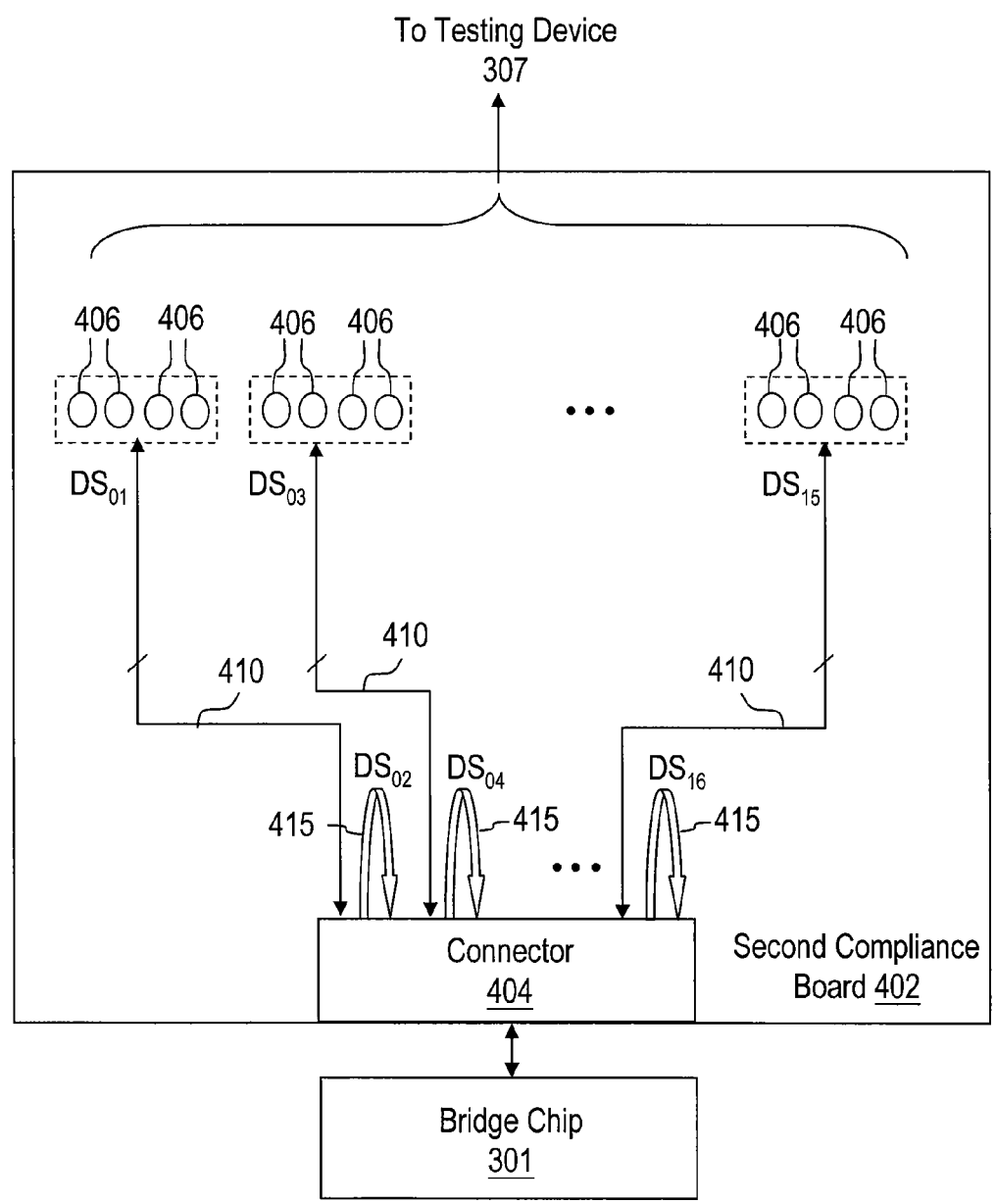
FIG. 4 is a simplified diagram of a second compliance board configured to selectively transmit data signals carried on odd data lanes for compliance testing, according to one embodiment of the present invention.

To illustrate, FIG. 4 is a simplified diagram of a second compliance board 402 configured to selectively transmit data signals carried on odd data lanes for compliance testing, according to one embodiment of the present invention. Similar to the first compliance board 302, the second compliance board 402 comprises a connector 404 for connecting the bridge chip 301 under testing, a plurality of SMA connectors 406 for connecting the testing device 307, first circuit traces 410 for transmitting tested data signals between the connector 404 and the SMA connectors 406, and second circuit traces 415 for returning untested data signals back to the bridge chip 301. Selected data signals transmitted through the first circuit traces 410 comprise odd data lane signals $DS_{01}, DS_{03}, \ldots$ $DS_{15}$, and untested signals looped back through the second circuit traces 415 comprise even data lane signals $DS_{02}$, $DS_{04}$, ... $DS_{16}$. After the even data lane signals have been tested with the first compliance board 302, the odd data lane signals can be tested through the second compliance board 402 in the same manner.

By separately testing even and odd data lane signals, the design of each compliance board can thus be simplified, and its surface area reduced because less SMA connectors are required. While the data signals have been grouped into even data lane signals and odd data lane signals for separate testing, different grouping methods for the data lane signals may also be applicable according to the number of data lane signals, or data pin layout.

Figure 5:
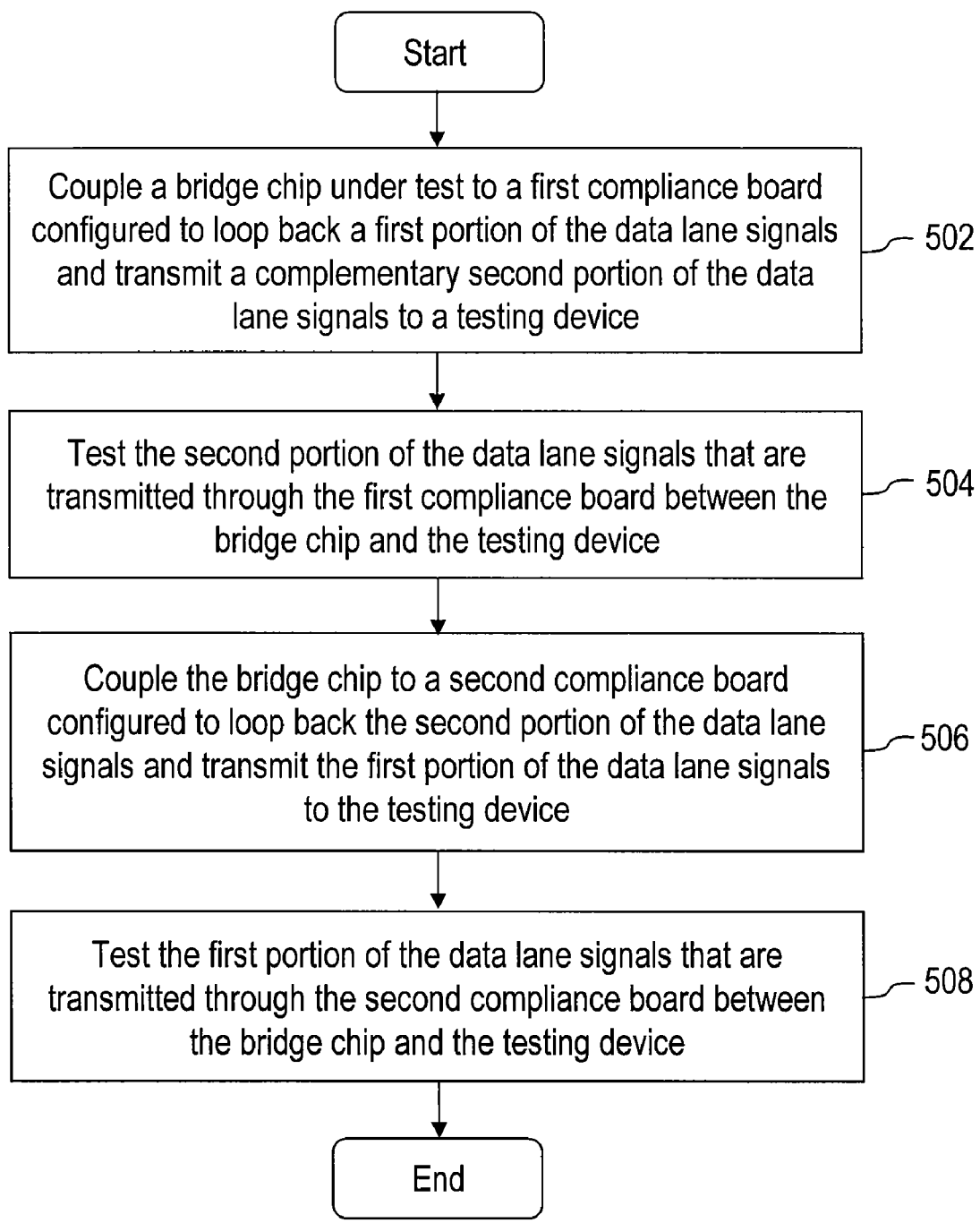
FIG. 5 is a flowchart that resumes the general method steps performed to test a PCIE expansion system according to an embodiment of the present invention.

In conjunction with FIGS. 3A and 4, FIG. 5 is a flowchart that resumes the general method steps performed to test a PCIE expansion system according to an embodiment of the present invention. In initial step 502, the bridge chip 301, having a number of data lane signals to be tested, is coupled to a first compliance board 302 that is configured to loop back a first portion of the data lane signals (such as odd data lane signals $DS_{01}, DS_{03} \ldots DS_{15}$), and transmit a complementary second portion of the data lane signals (such as even data lane signals $DS_{02}, DS_{04}, \ldots DS_{16}$) to a testing device 307. In step 504, testing is then conducted on the second portion of data lane signals that are transmitted via the first compliance board 302 between the bridge chip 301 and the testing device 307. After the testing of the first portion of the data lane signals is completed, the bridge chip 301 in step 506 is then coupled to a second compliance board 402 that is configured to loop back the second portion of the data lane signals (i.e. even data lane signals $DS_{02}, DS_{04}, \ldots DS_{16}$), and transmit the first portion of the data lane signals (i.e. odd data lane signals $DS_{01}$, $DS_{03}, \ldots DS_{15}$) to the testing device 307. In step 508, testing is then applied on the first portion of data lane signals that are transmitted via the second compliance board 402 between the bridge chip 301 and the testing device 307. All the data lane signals of the bridge chip 301 can thereby be tested.

As described above, the provided method and system thus enable convenient compliance testing of the PCIE expansion system by grouping the data signals into smaller sets of data lane signals for separate testing. As less data signals are tested through each compliance board, the design of each compliance board can be simplified, and its surface area reduced.

The above description illustrates various embodiments of the present invention along with examples of how aspects of the present invention may be implemented. The above examples, embodiments, instruction semantics, and drawings should not be deemed to be the only embodiments, and are presented to illustrate the flexibility and advantages of the present invention as defined by the following claims.

I claim:

1. A method for testing a Peripheral Component Interconnect Express ("PCIE") expansion system that comprises a plurality of data lanes along which data signals are transmitted, the method comprising:
    delivering the data signals from the data lanes to a compliance board that is configured to loop back at least a first portion of the data signals and transmit a complementary second portion of the data signals to a testing device, wherein the complimentary second portion of the data signals comprises the data signals that are not included in the first portion of the data signals; and
    testing a compliance of the complimentary second portion of the data signals with requirements of a PCIE specification.

2. The method of claim 1, wherein the first portion of the data signals comprises signals transmitted along odd data lanes, and the complimentary second portion of the data signals comprises signals transmitted along even data lanes.

3. The method of claim 1, wherein the first portion of the data signals comprises signals transmitted along even data lanes, and the complimentary second portion of the data signals comprises signals transmitted along odd data lanes.

4. The method of claim 1, wherein delivering the data signals from the data lanes to a compliance board is performed through a Very High Density Cable Interconnect ("VHDCI") connector.

5. The method of claim 4, wherein delivering the data signals from the data lanes to a compliance board comprises connecting the compliance board via the VHDCI connector with a bridge chip of the PCIE expansion system.

6. The method of claim 1, wherein each data lane comprises two pairs of differential signaling voltages.

7. The method of claim 6, wherein the two pairs of differential signaling voltages comprise a receiver pair and a transmitter pair.

8. The method of claim 7, wherein the compliance board is configured to link the receiver pair to the transmitter pair of each of the data lanes that transmit the first portion of the data signals.

9. The method of claim 1, further comprising:
    delivering the data signals from the data lanes to a second compliance board configured to loop back the complimentary second portion of the data signals and transmit the first portion of the data signals to the testing device; and
    testing a compliance of the first portion of the data signals with the requirements of the PCIE specification.

10. A system for testing a PCIE expansion system that comprises a plurality of data lanes along which data signals are transmitted, the system comprising:
    at least a first compliance board comprising:
        a plurality of first circuit traces configured to loop back at least a first portion of the data signals;
        a plurality of second circuit traces configured to transmit a complementary second portion of the data signals to a plurality of first connectors for testing, wherein the complimentary second portion of the data signals comprises the data signals that are not included in the first portion of the data signals; and
    a second compliance board comprising:
        a plurality of third circuit traces configured to loop back the complimentary second portion of the data signals; and
        a plurality of fourth circuit traces configured to transmit the first portion of the data signals to a plurality of second connectors for testing.

11. The system of claim 10, wherein the first portion of the data signals comprises signals transmitted along odd data lanes, and the complimentary second portion of the data signals comprises signals transmitted along even data lanes.

12. The system of claim 10, wherein the first portion of the data signals comprises signals transmitted along even data lanes, and the complimentary second portion of the data signals comprises signals transmitted along odd data lanes.

13. The system of claim 10, wherein either of the first and second compliance board comprises a VHDCI connector for connecting with the PCIE expansion system.

14. The system of claim 13, wherein the VHDCI connector is adapted to connect with a bridge chip of the PCIE expansion system.

15. The system of claim 10, wherein each data lane comprises two pairs of differential signaling voltages.

16. The system of claim 15, wherein the two pairs of differential signaling voltages comprise a receiver pair and a transmitter pair.

17. The system of claim 16, wherein the first circuit traces are configured to link the receiver pair to the transmitter pair of each of the data lanes that transmit the first portion of the data signals.

18. The system of claim 16, wherein the third circuit traces are configured to link the receiver pair to the transmitter pair of each of the data lanes that transmit the complimentary second portion of the data signals.

19. The system of claim 10, wherein the plurality of first and second connectors comprise Subminiature Version A ("SMA") connectors.

20. The system of claim 10, further comprising a testing module adapted to connect to either of the plurality of first connectors or second connectors.

* * * * *